(12) United States Patent
Baikalov et al.

(10) Patent No.: US 9,516,041 B2
(45) Date of Patent: Dec. 6, 2016

(54) CYBER SECURITY ANALYTICS ARCHITECTURE

(71) Applicant: Bank of America Corporation, Charlotte, NC (US)

(72) Inventors: Igor A. Baikalov, Thousand Oaks, CA (US); Craig Froelich, Thousand Oaks, CA (US); Terry McConnell, Oak Park, CA (US); John P. McGloughlin, Jr., Santa Paula, CA (US)

(73) Assignee: Bank of America Corporation, Charlotte, NC (US)

( * ) Notice: Subject to any disclaimer, the term of this patent is extended or adjusted under 35 U.S.C. 154(b) by 167 days.

(21) Appl. No.: 13/951,128

(22) Filed: Jul. 25, 2013

(65) Prior Publication Data
US 2015/0033337 A1    Jan. 29, 2015

(51) Int. Cl.
*H04L 29/06* (2006.01)

(52) U.S. Cl.
CPC ................. *H04L 63/1408* (2013.01)

(58) Field of Classification Search
CPC .................................... H04L 63/1416
See application file for complete search history.

(56) References Cited

U.S. PATENT DOCUMENTS

| | | | |
|---|---|---|---|
| 2004/0006704 A1* | 1/2004 | Dahlstrom | G06F 21/577 726/25 |
| 2007/0180107 A1* | 8/2007 | Newton et al. | 709/224 |
| 2007/0226796 A1* | 9/2007 | Gilbert et al. | 726/22 |
| 2009/0024627 A1* | 1/2009 | King | 707/9 |
| 2011/0138471 A1* | 6/2011 | Van De Weyer | G06F 21/554 726/25 |
| 2011/0161848 A1* | 6/2011 | Purcell et al. | 715/764 |
| 2011/0288692 A1* | 11/2011 | Scott | 700/297 |
| 2013/0307682 A1* | 11/2013 | Jerhotova et al. | 340/521 |

* cited by examiner

*Primary Examiner* — Jeffrey Pwu
*Assistant Examiner* — William Corum, Jr.
(74) *Attorney, Agent, or Firm* — Banner & Witcoff, Ltd.; Michael A. Springs

(57) ABSTRACT

Systems and methods are disclosed for responding to security events in real time. The disclosed systems and methods utilize the vast amount of risk and asset knowledge collected in a security data warehouse and aggregated in a security information manager, without the expense and latency associated with performing such calculations in real time. The disclosed systems and methods, thereby, significantly extend the time intervals feasible for temporal analysis.

13 Claims, 4 Drawing Sheets

CYBER SECURITY ANALYTICS ARCHITECTURE

TECHNICAL FIELD

Aspects of the disclosure relate generally to a cyber security analytics architecture. In particular, various aspects of the disclosure relate to methods and systems for analyzing events and detecting risks in real time and based on historical data to provide security for large-scale enterprises.

BACKGROUND

Large scale enterprises have become more complex and require a number of separate systems to communicate. As a result, computing devices are being required to interact with more systems in order to accomplish their assigned functionality. Furthermore, these computing devices must interact with overwhelming amounts of data. Therefore, it is becoming increasingly difficult for computing devices to perform data analytics and address real-time events and risks to an enterprise. Accordingly, there is a need for systems and methods addressing one or more of these shortcomings.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Certain aspects disclose a computer-implemented method comprising: transferring, at a security event manager, data to a security data warehouse; comparing the data, at the security data warehouse, to information stored in a risk ontology, wherein the comparing is performed to determine whether the data should be transferred to a security information manager; receiving, at the security information manager, the data when the security data warehouse determines that the data should be transferred to the security information manager; comparing, at the security information manager, the data to stored rules and other stored information to determine a security context; transferring, at the security information manager, the security context to the security event manager, wherein the security context allows the security event manager to determine an event's risk level; receiving, at the security event manager, an event; and outputting, at the security event manager, the event's risk level.

Certain other aspects disclose a non-transitory computer-readable storage medium having computer-executable program instructions stored thereon that, when executed by a processor, cause the processor to: transfer, at security event manager, data to a security data warehouse; compare the data, at the security data warehouse, to information stored in a risk ontology, wherein the comparing is performed to determine whether the data should be transferred to a security information manager; receive, at the security information manager, the data when the security data warehouse determines that the data should be transferred to the security information manager; compare, at the security information manager, the data to stored rules and other stored information to determine a security context; transfer, at the security information manager, the security context to the security event manager, wherein the security context allows the security event manager to determine an event's risk level; receive, at the security event manager, an event; and outputting, at the security event manager, the event's risk level.

Further aspects disclose a system comprising: a security event manager configured to monitor and respond to real-time events; a security data warehouse configured to receive and store data in its original form, wherein the security data warehouse receives data from the security event manager, assets, monitoring, threat analysis, and external event sources; a risk ontology configured to provide a sustainable data model representing assets, relationships, and risk factors; and a security information manager configured to provide a description of an enterprise's risk landscape by gathering, combining, and rationalizing all of the asset, risk, and relationship data in the enterprise.

The details of these and other embodiments of the disclosure are set forth in the accompanying drawings and description below. Other features and advantages of aspects of the disclosure will be apparent from the description, drawings, and claims.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, sever to explain principles of the disclosure. In the drawings:

DETAILED DESCRIPTION

In accordance with various aspects of the disclosure, methods, non-transitory computer-readable media, and systems are disclosed for securing an enterprise via a cyber security analytics architecture. In certain aspects, when a server receives data from a computing device, the server processes and analyzes the data. The automated process may utilize various hardware components (e.g., processors, communication servers, memory devices, etc.) and related computer algorithms to generate image data related to the agency's business data.

Figure 1:
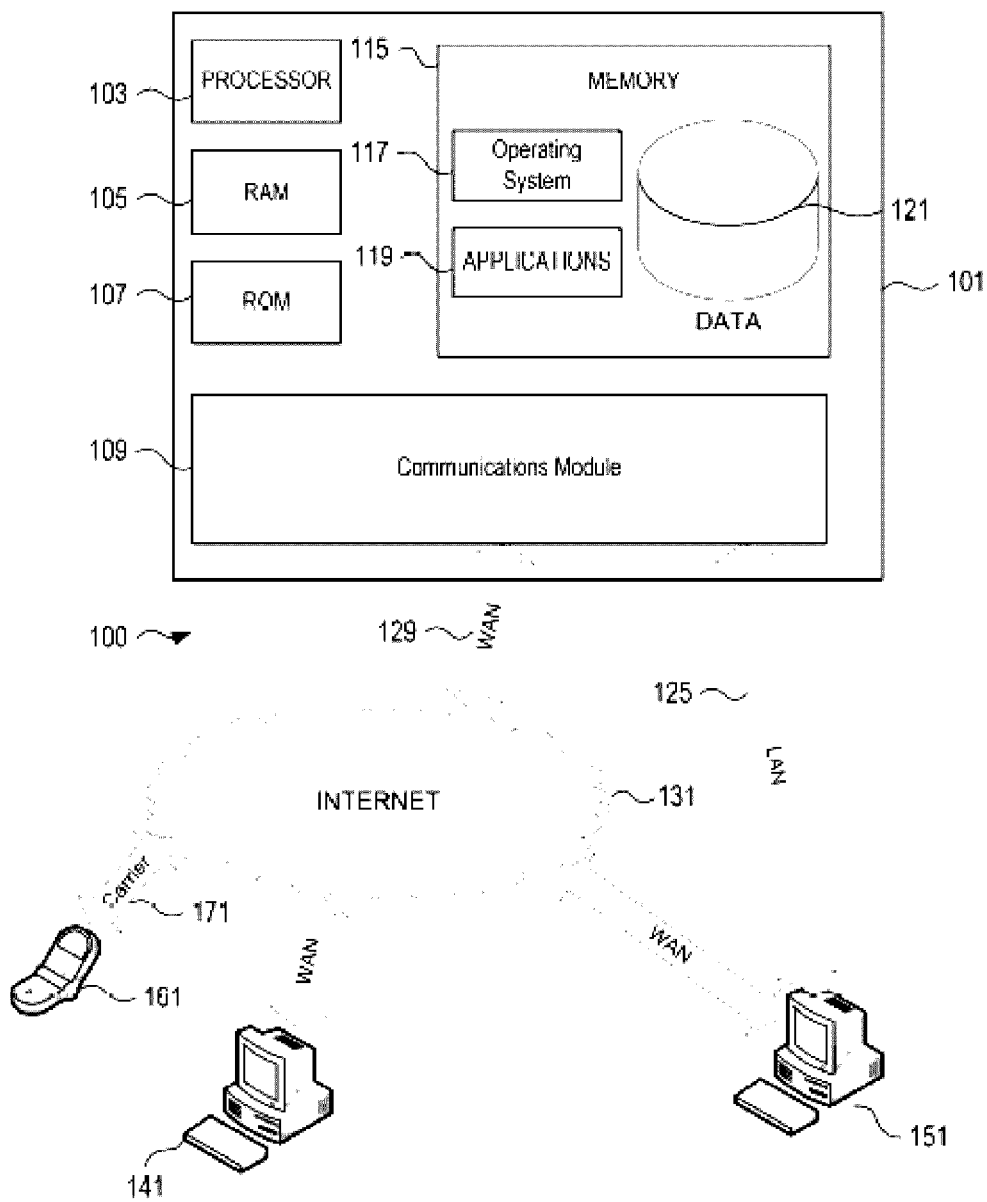
FIG. 1 shows an illustrative operating environment in which various aspects of the disclosure may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

With reference to FIG. 1, the computing system environment 100 may include a server 101 wherein the processes discussed herein may be implemented. The server 101 may have a processor 103 for controlling the overall operation of the server 101 and its associated components, including random-access memory (RAM) 105, read-only memory (ROM) 107, communications module 109, and memory 115. Processor 103 and its associated components may allow the server 101 to run a series of computer-readable instructions related to receiving, storing, and analyzing data to determine an event's risk level.

Server 101 typically includes a variety of computer-readable media. Computer-readable media may be any available media that may be accessed by server 101 and include both volatile and non-volatile media, removable and non-removable media. For example, computer-readable media may comprise a combination of computer storage media and communication media.

Computer storage media include volatile and non-volatile, removable and non-removable media implemented in any method or technology for storage of information such as computer-readable instructions, data structures, program modules, or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information that can be accessed by server 101.

Computing system environment 100 may also include optical scanners (not shown). Exemplary usages include scanning and converting paper documents, such as correspondence, data, and the like to digital files.

Although not shown, RAM 105 may include one or more applications representing the application data stored in RAM 105 while the server 101 is on and corresponding software applications (e.g., software tasks) are running on the server 101.

Communications module 109 may include a microphone, keypad, touch screen, and/or stylus through which a user of server 101 may provide input, and may also include one or more of a speaker for providing audio output and a video display device for providing textual, audiovisual and/or graphical output.

Software may be stored within memory 115 and/or storage to provide instructions to processor 103 for enabling server 101 to perform various functions. For example, memory 115 may store software used by the server 101, such as an operating system 117, application programs 119, and an associated database 121. Also, some or all of the computer executable instructions for server 101 may be embodied in hardware or firmware.

Server 101 may operate in a networked environment supporting connections to one or more remote computing devices, such as computing devices 1141, 151, and 161. The computing devices 141, 151, and 161 may be personal computing devices or servers that include many or all of the elements described above relative to the server 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, server 101 may be connected to the LAN 125 through a network interface or adapter in the communications module 109. When used in a WAN networking environment, the server 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system may be operated in a client-server configuration to permit a user to retrieve web pages from a web-based server. Any of various conventional web browsers may be used to display and manipulate on web pages.

Additionally, one or more application programs 119 used by the server 101, according to an illustrative embodiment, may include computer executable instructions for invoking functionality related to communication including, for example, email short message service (SMS), and voice input and speech recognition applications. In addition, the application programs 119 may include computer executable instructions for invoking user functionality related to access a centralized repository for performing various service tasks like routing, logging, and protocol bridging.

Embodiments of the disclosure may include forms of computer-readable media. Computer-readable media include any available media that can be accessed by a server 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For instance, aspects of the method steps disclosed herein may be executed on a processor 103 on server 101. Such a processor may execute computer-executable instructions stored on a computer-readable medium.

Figure 2:
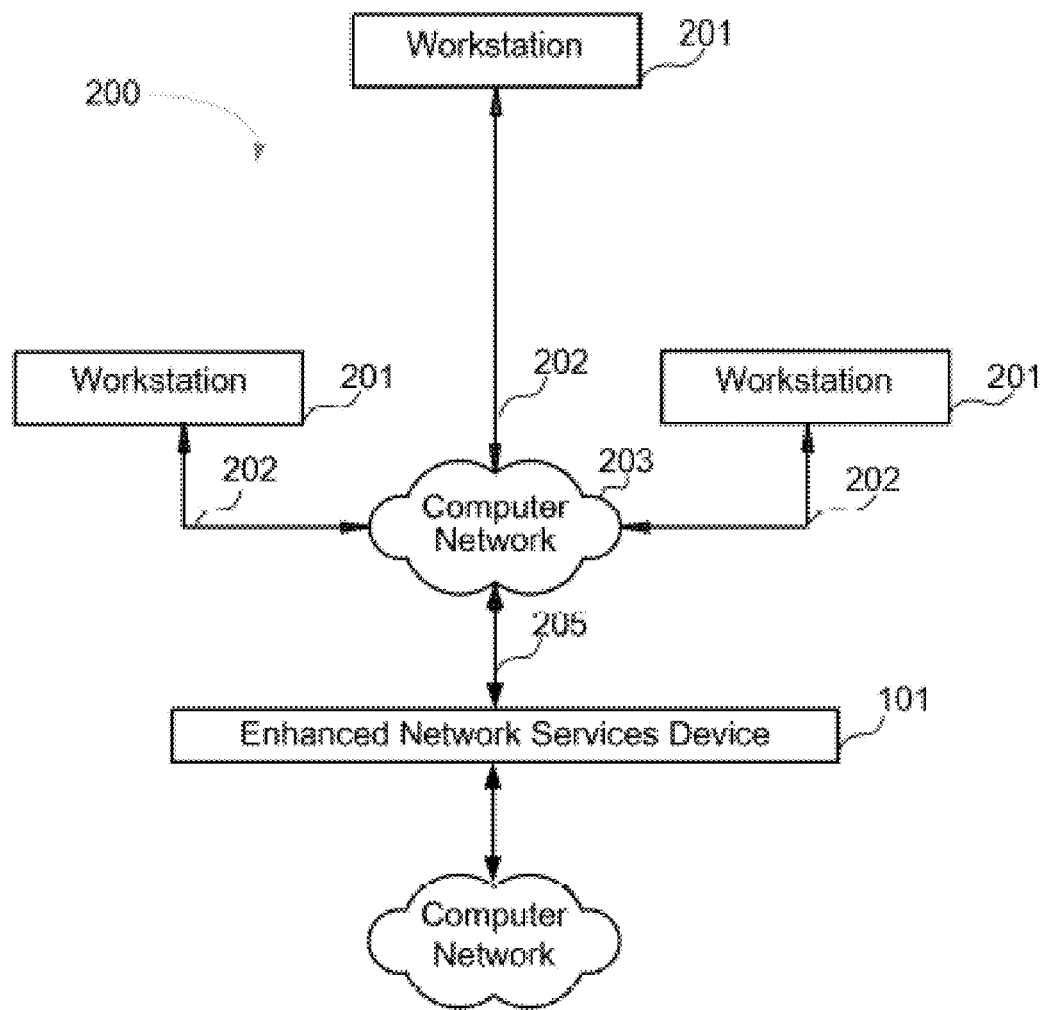
FIG. 2 shows an illustrative shows an illustrative block diagram of workstations and servers that may be used to implement the processes and function of one or more aspects of the present disclosure.

FIG. 2 illustrates another example operating environment in which various aspects of the disclosure may be implemented. As illustrated, system 200 may include one or more workstations 201. Workstations 201 may, in some examples, be connected by one or more communications links 202 to computer network 203 that may be linked via communications links 205 to server 204. In system 200, server 204 may be any suitable server, processor, computer, or data processing device, or combination of the same. Server 204 may be used to process the instructions received from, and the transactions entered into by, one or more participants.

According to one or more aspects, system 200 may be associated with a financial institution, such as a bank. Various elements may be located within the financial institution and/or may be located remotely from the financial institution. For instance, one or more workstations 201 may be located within a branch office of a financial institution. Such workstations may be used, for example, by customer service representatives, other employees, and/or customers of the financial institution in conducting financial transactions via network 203. Additionally or alternatively, one or more workstations 201 may be located at a user location (e.g., a customer's home or office). Such workstations also may be used, for example, by customers of the financial institution in conducting financial transactions via computer network 203.

Computer network 203 may be any suitable computer network including the Internet, an intranet, a wide-area network (WAN), a local-area network (LAN), a wireless network, a digital subscriber line (DSL) network, a frame relay network, and asynchronous transfer mode network, a virtual private network (VPN), or any combination of any of the same. Communications links 202 and 205 may be any communications links suitable for communicating between workstations 201 and server 204, such as network links, dial-up links, wireless links, hard-wired links, and/or the like.

Having described an example of a computing device that can be used in implementing various aspects of the disclosure and an operating environment in which various aspects of the disclosure can be implemented, several embodiments will now be discussed in greater detail.

In an embodiment, an enterprise, such as a bank, may service user requests from a user computing device. For example, a bank may service user requests generated at a computing device and routed to a bank computing device through a network, for example the Internet. User requests may be generated by entities that work with the organization, divisions within the organization, or individuals, such as bank customers. These requests may include user requests to electronically manage a customer account with the bank, to access electronic information, or any other suitable request.

The users accessing server 204 in system 200 may be referred to as assets. Assets may also describe other entities that may attempt to access an enterprise, such as workstations, network equipment, computer systems, and the like. In certain aspects, an asset may be considered an individual component in a system. For example, system 200 may represent an enterprise's, such as a large bank's, computer system. Each workstation, server, user, application, and network device may be considered an asset. Thus, to ensure security of the enterprise's system, the bank (in this and foregoing examples) must be able to monitor its assets and detect and respond to real-time threats posed by any particular asset.

Figure 3:
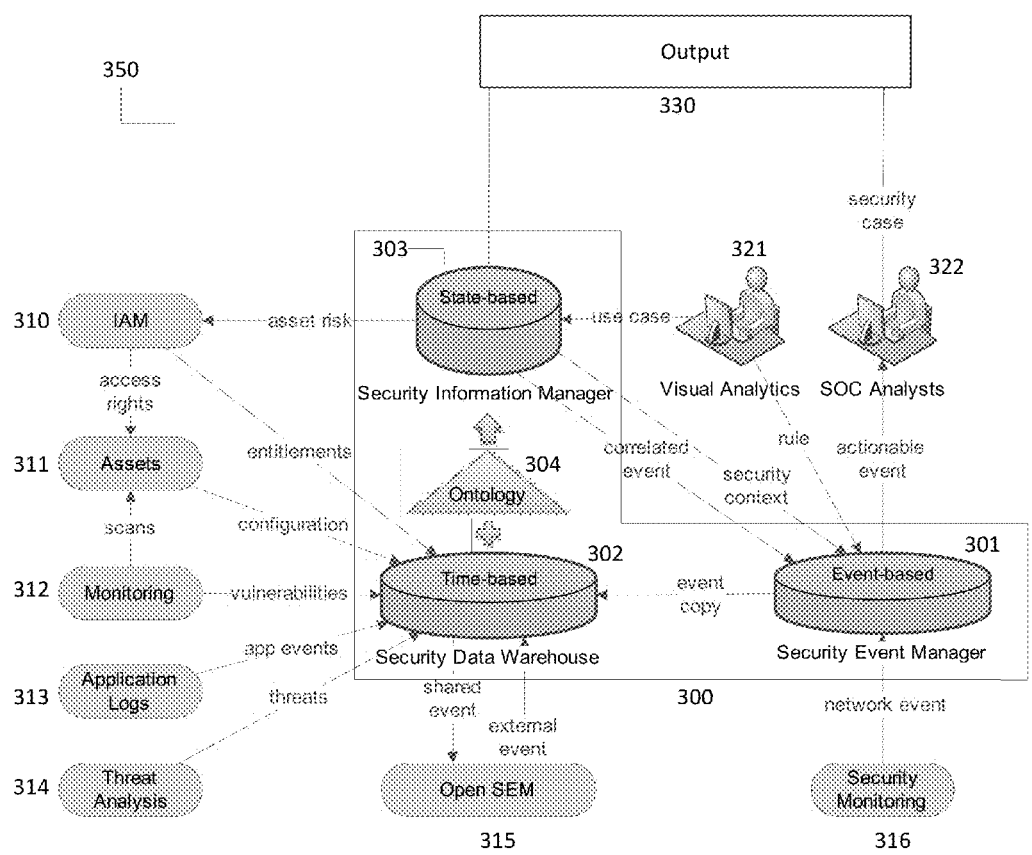
FIG. 3 shows an illustrative embodiment of a security analytics system in accordance with aspects of the disclosure.

FIG. 3 illustrates an example of a security analytics system 350 in which aspects of the disclosure may be implemented. The security analytics system 350 comprises a architecture 300. The architecture 300 may comprise a security event manager (SEM) 301, a security data warehouse 302, a security information manager (SIM) 303, and a risk ontology 304. In some aspects, architecture 300 may be located in a server 101, or across a plurality of servers 101. The architecture 300 may be stored, in certain aspects, in a memory 115 of server 101. In certain other aspects, portions of the architecture 300 may be stored in a plurality of servers 101. For instance, SEM 301 and security data warehouse 302 may be stored in a first server and SIM 303 and risk ontology 304 may be stored in a second server. Furthermore, architecture 300 may include a plurality of SEMs 301, security data warehouses 302, SIMs 303, and risk ontologies 304.

Architecture 300 may allow an enterprise to monitor its assets and detect and respond to real-time threats posed by any particular asset. Architecture 300 may secure a system against threats by monitoring the data transmitted by assets. In some aspects, the data transmitted by assets may include, or be associated with, events. An event may be an action taken by an asset that could serve as a threat to a system or enterprise. Such actions may include, for example, transmitting data over the system, downloading or uploading data, logging into the system, and the like. As an example, a user may attempt to log into the system by entering username and password into workstation 201. The data entered by the user is associated with an event (i.e. logging into the system). Therefore, the data is initially received by security event manager 301 in architecture 300.

SEM 301 may receive and act upon data in real time. SEM 301 may comprise one or more components of server 101. Further, SEM 301 may comprise computer executable instructions, that when executed by a processor, cause the processor to perform a set of actions. SEM 301 may act upon data in real time using rules provided by analytics 321 information received from SIM 303. In certain aspects, the information transferred from SIM 303 to SEM 301 may include security context. A security context may be considered an understanding of the environment in which an event is occurring. Security context transferred from SIM 303 may provide the SEM 301 with greater insight as to the event and its implications on the system and other assets within the system. Thus, security context may allow SEM 301 to quickly analyze data associated with an event and determine whether the asset associated with the data is a threat. The method with which the SIM 303 may establish security context will be discussed in greater detail below.

SEM 301 may also receive data from security monitoring 316. Security monitoring 316 may monitor the fastest moving network data, such as proxy logs, firewall information, and other data that must be processed at the asset level. In some aspects security monitoring 316 network events may be the only type of data that is mapped against a rule manager located in SEM 301. In certain aspects, a copy of the event may be transferred from SEM 301 to security data warehouse 302 for more analysis.

In certain aspects, SIM 303 may transfer one or more correlated events to SEM 301. The correlated events may be determined at SIM 303 based on use cases received from analytics 321, as will be discussed in greater detail below. SEM 301 may also receive and store rules transmitted by analytics 321. In some aspects, the rules transmitted by analytics 321 may provide SEM 301 instructions for handling and responding to analyzed events. As an example, SEM 301 may receive data associated with the event that a user has logged into the system. Based on the security context and any correlated events, the SEM 301 may determine that the user (i.e. asset) has a risk level of 7 out of 10. SEM 301 may then analyze its stored rules provided by analytics 321, which may provide that assets with a risk level of 5 out of 10 or greater must be denied access to the system. The security contexts, correlated events, and rules may be stored in SEM 301 prior to the event, thereby avoiding delays associated with analyzing events and performing calculations at SEM 301. Rather, SEM 301 may be able to receive and respond to events in real time.

In some aspects, after the SEM 301 receives data associate with an event, SEM 301 may transfer the data or a copy of the event to security data warehouse 302. Security data warehouse 302 may comprise one or more components of server 101. Further, security data warehouse 302 may comprise computer executable instructions, that when executed by a processor, cause the processor to perform a set of actions. In certain aspects of the disclosure, the security data warehouse 302 may receive data in its original form, unmodified and unfiltered. The security data warehouse 302 may serve as a repository for all raw data distributed throughout the system 350. Data may be stored in security data warehouse 302 over long periods of time for analysis and anomaly detection.

In certain aspects, one or more security data warehouses 302 may store all of the raw data distributed throughout an enterprise's system. A benefit this provides over other prior art systems is that it allows the SIM 303 to provide a richer security context to SEM 301. Rather than performing all of the steps in a single component of a system, architecture 300 may more efficiently handle received data by separating data into at least three components. Architecture 300 does not require one component to store all data in the system, perform calculations and determine security contexts, while also responding to events that may occur. Instead, SEM 301 may focus on responding to events in real time, security data warehouse 302 may focus on storing all data passed through the system, and SIM 303 may be responsible for analyzing the relevant data (determine via risk ontology 304) in order to provide security context for SEM 301. Because, in some aspects, security data warehouse 302 may only be responsible for storing data, it may be configured to store all data distributed in an enterprise's system, whereas other prior art systems may not have been able to store such large quantities of data. More data stored in security data warehouse 302 provides more tools for SIM's 303 analytics in determining a rich security context, which in turn enables SEM 301 to more thoroughly detect and respond to threats.

In some aspects of the disclosure, security data warehouse 302 may receive and store data from one or more other sources, such as an identity and access management (IAM) 310, assets 311, monitoring 312, application logs 313, threat analysis 314, and external event sources (or Open SEM) 315. System 350 may comprise one or more of these sources, or each source may comprise a component of another system communicating with architecture 300. IAM 310 may control user access to resources within the enterprise. IAM 310 may maintain each user's level of access within the enterprise and provide that entitlement information to security data warehouse 302. For example, users determined to be "administrators" in IAM 310 may be provided greater access than those determined to be "end users". Security data warehouse 302 may store this entitlement information received from IAM 310.

Security data warehouse may also receive and store configuration information from assets 311. As shown in FIG. 3, assets 311 may also receive access rights from IAM 310, which may provide areas of the enterprise that the asset may access. Furthermore, monitoring 312 may provide scans of the assets 311 and transmit vulnerabilities to security data warehouse 302. In certain aspects, monitoring 312 may be a security system downloaded on the asset, such as an antivirus system. The vulnerabilities detected by monitoring 312 may be stored in security data warehouse 302.

In some aspects, applications logs 313 may record transactions processed by applications in the enterprise. Applications logs 313 may transfer the recorded transactions to the security data warehouse 302. In certain other aspects, applications logs 313 may transfer events to security data warehouse 302. Security data warehouse 302 may also receive and store threats determined by threat analysis 314. Threat analysis 314 may be a source that collects information about external risks facing an enterprise. Threat analysis 314 may, further, provide a classification of vulnerabilities, overall risk landscape of the enterprise, and a description of potential threats. Similarly, security data warehouse may store external events received from external event sources 315. External event sources 315 may serve as an interface between the enterprise and other risk partners. For example, the bank enterprise may partner with government officials, financial security services, or other third parties to share information regarding various threats or attacks that may be eminent. This data may be transmitted from external event sources 315 to security data warehouse 302 and vice versa.

Figure 4:
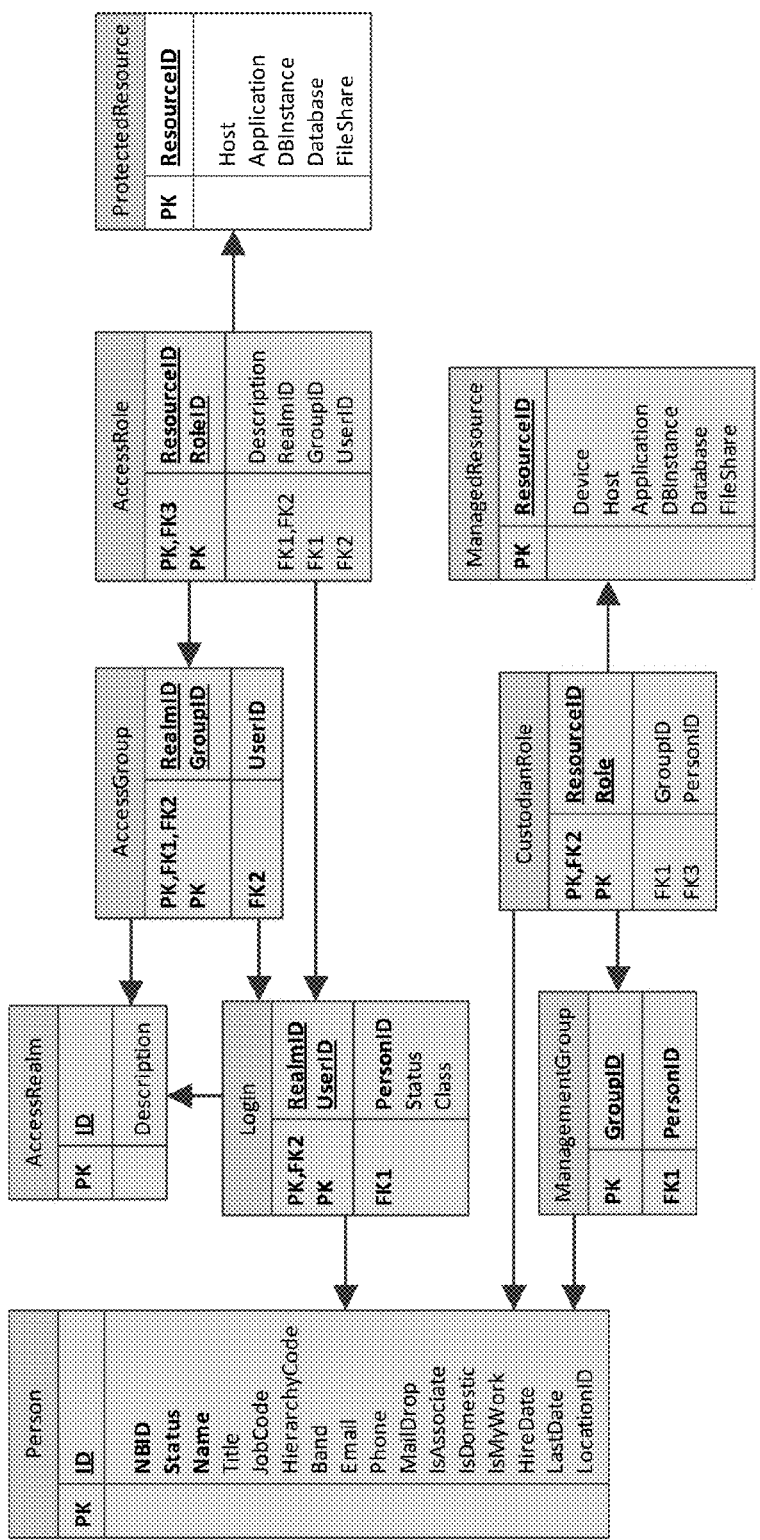
FIG. 4 shows an illustrative embodiment of a risk ontology in accordance with aspects of the disclosure.

Once data has been received and stored in security data warehouse 302, the data is mapped, or compared to, information stored in risk ontology 304. An exemplary portion of an enterprise's risk ontology is illustrated in FIG. 4. As shown in FIG. 4, the ontology may be a sustainable data model representing assets, relationships, and risk factors in various databases, or tables. Each table stores data corresponding to a particular object. Objects in exemplary FIG. 4 include Person, AccessRealm, Login, AccessGroup, AccessRole, ProtectedResource, ManagementGroup, CustodianRole, and ManagedResource. Each table in the ontology may store primary keys (PK) and foreign keys (FK) for each element of the table. Also shown in FIG. 4 are arrows displaying the relationship between the various objects. For example, Login is related to AccessRealm and Person according to the stored primary keys and foreign keys in Login. Administrators or other parties may format the tables and corresponding objects and data in the risk ontology according to their preferred data to be monitored by SIM 303. In some aspects, the risk ontology may be a dynamic risk ontology that may be mapped to other ontologies, such as IAM ontologies.

In certain aspects, every data element transferred from security data warehouse 302 to SIM 303 may first be mapped to risk ontology 304. In such aspects, the risk ontology 304 may define every data element before being transferred to SIM 303. Thus, system 350 may, in attempt to accelerate data ingestion rates and onboarding of new data sources, allow consumption of undocumented data elements, without any regard to how these data elements are related to other elements and the overall risk model. In some aspects, risk ontology 304 may be modified at any time. For example, risk ontology 304 may be modified such that previously unused data elements stored in security data warehouse 302 may be added to SIM 303. Therefore, system 350 may ensure that no data is lost in translation at risk ontology 304.

In some aspects, security data warehouse 302 may compare its stored data to information in risk ontology 304 to determine if the data should be transferred to SIM 303. For example, the security data warehouse 302 may determine that the data should be transferred to the security information manager after locating the data on the risk ontology. In certain other aspects, processor 103 may compare the data stored in security data warehouse 302 to the information in risk ontology 304 to determine if the data should be transferred to SIM 303. In some aspects, once security data warehouse 302 has determined that the data should be transferred to SIM 303, SIM 303 will receive the data from security data warehouse 302.

After receiving data from security data warehouse 302, SIM 303 may gather, combine, and rationalize some or all of the data it has received to provide the best possible description of the enterprise's risk landscape at that time. SIM 303 may comprise one or more components of server 101. Further, SIM 303 may comprise computer executable instructions, that when executed by a processor, cause the processor to perform a set of actions. SIM 303 may be configured to analyze the data it receives from security data warehouse 302 in order to provide a rich security context to SEM 301. SIM 303 may be programmed to analyze trends in received data to detect anomalies associated with particular events and threats. For a simplified example, SIM 303 may analyze collected data that displays a trend of a high threat alert when a user login is attempted at a unique IP address for the first time. SIM 303 may recognize that the trend in this example tends to display a high likelihood of computer hacking SIM 303 may transfer this security context information to SEM 301, so when a user login is attempted at a unique IP address for the first time, SEM 301 will immediately recognize the event and respond in real-time, i.e. by disallowing login access at that time.

SIM 303 may generally handle static data, security data warehouse 302 may handle time-based data, and SEM 301 may handle event-based data. Thus data may be segregated by system 350 in such a way as to deal with multiple types of data (i.e. real-time data, historical, structured data mapped to a risk model, etc.) rather than separating data by niche (i.e. network data, asset data, etc.). In some aspects, SIM 303 may serve as a single source of truth for all asset and risk data used within system 350. System 350 may also maximize data accuracy by eliminating re-provisioning and minimizing distance to source. In certain aspects, SIM 303 may only store information understood in the context of a risk model. Therefore, the amount of data stored in SIM 303 and the latency to access data in SIM 303 may be substantially reduced.

SIM 303 may receive use cases from analytics 321. An example of a use case may be a change in an employee's status from active to terminated. Analytics 321 may provide this information directly to SIM 303. SIM 303 may, in turn, analyze the information and transfer it to SEM 301 in the form of a correlated event. Thus, if the employee attempts to log into the system once terminated, SEM 301 will recognize the correlated event and block the employee's attempt. In some aspects, SEM 301 may also notify analysts 322 of an actionable event so that they can conduct appropriate action. Further, analysts 322 may send a security case notification to output 330, which may be similar to communications module 109 or workstations 201. Output allows a party to view information about a particular event or set of events. Similarly, SIM 303 may send event information to output 330. In certain aspects, SIM 303 may analyze data received from security data warehouse 302 to assess the risks associated with a particular asset and transmit the calculated asset risk to IAM 310.

Algorithms may be configured in SIM 303 to enable it to calculate risk scores associated with assets. In some aspects, SIM 303 and/or SEM 301 may determine an event's risk level by comparing an event's risk score to a threshold level, as discussed above. So, when SEM 301 receives an event, SEM 301 may output the event's risk level, for instance, at output 330. Thus, SEM 301 may respond to events in real time, as discussed above, by storing and analyzing previously received data to provide the SEM 301 with security context when receiving subsequent events. In other words, event data from time A may be received at SEM 301, stored in security data warehouse 302 along with data received prior to time A. The data received at time A may be mapped to risk ontology 304 and transferred to SIM 303 for analysis along with other data received prior to time A. From this analysis, SIM 303 may transfer a security context to SEM 301 so that SEM 301 may respond to an event received at subsequent time B and respond to the data received at subsequent time B in real time.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software by the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM.

What is claimed is:

1. A computer-implemented method, comprising:
   receiving, at a security event manager, computing event data characterizing one or more computing events initiated by one or more computing resources deployed on an internal computer network of an enterprise-wide computing system, wherein the computing event data comprises data including proxy logs, firewall information and other data processed at an asset level by a security system installed at the asset level;
   transferring, by the security event manager, the computing event data to a security data warehouse, wherein the security data warehouse stores historical computing event data in an unmodified and/or unfiltered form;
   comparing the computing event data stored at the security data warehouse to information stored in a risk ontology to determine whether to transfer at least a portion of the computing event data to a security information manager, wherein:
      the risk ontology comprises a dynamic data model representative of assets, relationships and risk factors between information stored in a plurality of risk ontology data objects where the dynamic data model defines relationships between the computing resources deployed on the internal computer network and users of the computing resources and defines risk factors associated with the computing resources;
      the plurality of risk ontology data objects comprise a person data object, an access realm data object, an access group data object, an access role data object and a protected resource data object corresponding to a login data object, and a custodian role data object corresponding to a management group data object and a managed resource data object; and
      the portion of the computing event data to be transferred to the security information manager comprises data elements located in the risk ontology data objects;
   receiving, at the security information manager, the portion of the computing event data in response to a comparison of the computing event data to the information stored in the risk ontology;
   determining, by the security information manager, a security context based on a comparison of the portion of the computing event data to user-defined rules; wherein the security context is determined through analysis of a trend in data received from the security data warehouse to detect an anomaly that is associated with a particular event or threat;

transferring, by the security information manager, the security context to the security event manager for use when determining a numerical risk level of a computing event;

receiving, in real-time by the security event manager, an indication that the computing event has occurred;

determining, in real-time by the security event manager, the numerical risk level of the computing event by comparing a risk score of the computing event to a predefined threshold risk level; and outputting, in real-time by the security event manager, the numerical risk level of the computing event, wherein the numerical risk level indicates an extent to which the computing event constitutes a threat to the enterprise-wide computing system.

2. The method of claim 1, wherein the security data warehouse collects and stores the data in an original form.

3. The method of claim 1, further comprising transferring correlated events from the security information manager to the security event manager.

4. The method of claim 1, determining to transfer the portion of the computing event data to the security information manager responsive to locating the portion of the computing event data in the risk ontology.

5. The method of claim 1, wherein the person data object is related to the login data object, the custodian role data object and the management group data object through one or more primary keys and foreign keys stored in each of the login data object, the custodian role data object and the management group data object.

6. The method of claim 1, wherein the login data object is related to the access group data object, the access role data object, the access realm data object and the person data object through one or more primary keys and foreign keys stored in each of the access group data object, the access role data object, the access realm data object and the person data object.

7. The method of claim 1, wherein the access realm data object is related to the login data object and the access group data object through one or more primary keys and foreign keys stored in each of the login data object and the access group data object.

8. The method of claim 1, wherein the access group data object is related to the access realm data object, the login data object and the access role data object through one or more primary keys and foreign keys stored in each of the access realm data object, the login data object and the access role data object.

9. The method of claim 1, wherein the access role data object is related to the login data object, the access group data object and the protected resource data object through one or more primary keys and foreign keys stored in each of the login data object, the access group data object and the protected resource data object.

10. The method of claim 1, wherein the protected resource data object is related to the access role data object through one or more public keys and foreign keys stored in the access role data object.

11. The method of claim 1, wherein the management group data object is related to the person data object and the custodian role data object through one or more primary keys and foreign keys stored in each of the person data object and the custodian role data object.

12. The method of claim 1, wherein the custodian role data object is related to the person data object, the management resource data object and the management group data object through one or more primary keys and foreign keys stored in each of the person data object, the management resource data object and the management group data object.

13. The method of claim 1, wherein the managed resource data object is related to the custodian role data object through one or more primary keys and foreign keys stored in the custodian role data object.

* * * * *